US008640239B2

(12) United States Patent
Lukas et al.

(10) Patent No.: US 8,640,239 B2
(45) Date of Patent: Jan. 28, 2014

(54) NETWORK INTRUSION DETECTION IN A NETWORK THAT INCLUDES A DISTRIBUTED VIRTUAL SWITCH FABRIC

(75) Inventors: Joshua Lukas, Mazeppa, MN (US); Gary R. Ricard, Chatfield, MN (US); Timothy L. Thompson, Whitefish, MT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/400,476

(22) Filed: Feb. 20, 2012

(65) Prior Publication Data

US 2013/0219497 A1 Aug. 22, 2013

(51) Int. Cl.
*H04L 29/00* (2006.01)

(52) U.S. Cl.
USPC .............................. 726/23; 726/22; 370/389

(58) Field of Classification Search
USPC .............................. 709/224; 370/389; 726/22
See application file for complete search history.

(56) References Cited

U.S. PATENT DOCUMENTS

| 6,775,657 | B1 | 8/2004 | Baker |
| 7,228,564 | B2 | 6/2007 | Raikar et al. |
| 7,606,225 | B2 | 10/2009 | Xie et al. |
| 7,614,085 | B2 | 11/2009 | Ben-Itzhak |
| 7,808,897 | B1 | 10/2010 | Mehta et al. |
| 7,849,506 | B1 | 12/2010 | Dansey et al. |
| 7,882,555 | B2 | 2/2011 | Ben-Itzhak |
| 2005/0254490 | A1* | 11/2005 | Gallatin et al. ............... 370/389 |
| 2008/0115204 | A1 | 5/2008 | Ramsey et al. |
| 2008/0201772 | A1 | 8/2008 | Mondaeev et al. |
| 2008/0212579 | A1 | 9/2008 | LaVigne et al. |
| 2010/0257263 | A1 | 10/2010 | Casado et al. |
| 2011/0238816 | A1* | 9/2011 | Vohra et al. ................... 709/224 |

OTHER PUBLICATIONS

Management of Network-Based Intrusion Detection Systems (NIDS)(Executive Summary), Total Data Pty LTD, Nov. 16, 2001.
Kim, B. et al., "ATPS—adaptive threat prevention system for high-performance intrusion detection and response," Managing Next Generation Networks and Services, Proceedings 10th Asia-Pacific Network Operations and Management Symposium, APNOMS 2007. (Lecture Notes in Computer Science vol. 4773), Oct. 10-12, 2007, pp. 344-353.
Revolutionalizing Network Design, Juniper Networks Inc., 2011.
Pelissier, Joe, "Introduction to Port Extension", Cisco Systems.
Merideth et al., "Elephant: Network Intrusion Detection Systems that Don't Forget", Jan. 2005.

(Continued)

*Primary Examiner* — Jeffrey Pwu
*Assistant Examiner* — Michael D Anderson
(74) *Attorney, Agent, or Firm* — Martin & Associates LLC; Derek P. Martin

(57) ABSTRACT

A network intrusion detection system (NIDS) works in conjunction with a distributed virtual switch fabric to provide enhanced network intrusion detection in a way that does not require as much human intervention, autonomically adjusts to hardware changes in the network, and responds much more quickly than known network intrusion detection systems. The NIDS accesses network information from the distributed virtual switch fabric, which gives the NIDS access to a virtual view that includes hardware information for all networking devices in the network. This allows the NIDS to automatically determine network topology, update itself as hardware in the network is added or changed, and promptly take automated service actions in response to detected network intrusions. The result is a NIDS that is easier to configure, maintain, and use, and that provides enhanced network security.

12 Claims, 9 Drawing Sheets

(56) References Cited

OTHER PUBLICATIONS

Management of Network-Based Intrusion Detection Systems (NIDS)(Executive Summary), Total Data Pty LTD, Nov. 16, 2001, pp. 1-19.
Revolutionalizing Network Design, Juniper Networks Inc., 2011, pp. 1-10.
Pelissier, Joe, "Introduction to Port Extension", Cisco Systems, Oct. 8, 2009, pp. 1-9.
Merideth et al., "Elephant: Network Intrusion Detection Systems that Don't Forget", Jan. 2005, pp. 1-10.

* cited by examiner

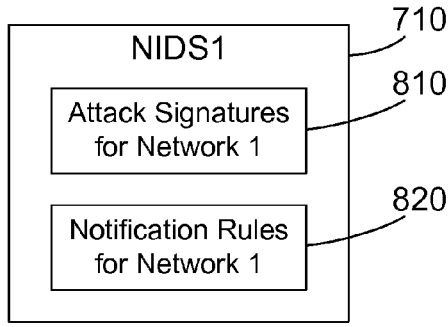
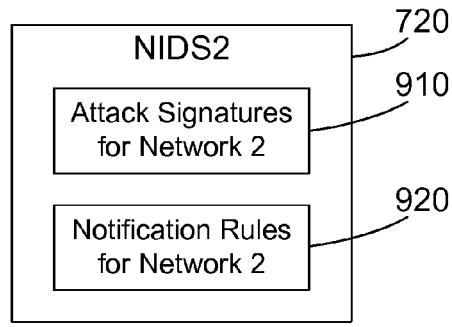
FIG. 8  Prior Art    FIG. 9  Prior Art
FIG. 10  Prior Art
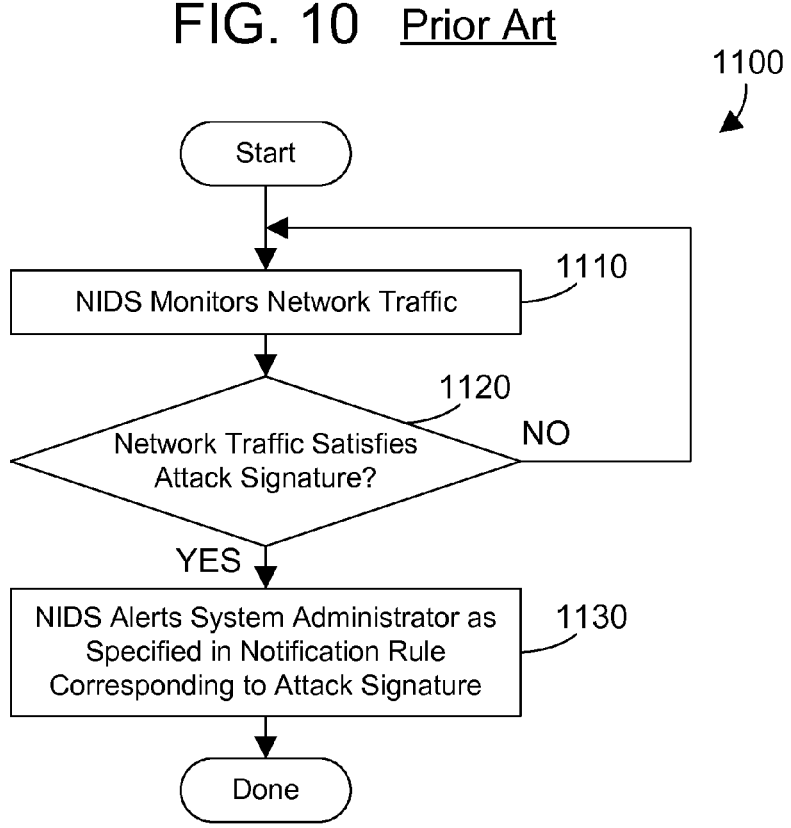
FIG. 11  Prior Art FIG. 12    <u>Prior Art</u>

US 8,640,239 B2

NETWORK INTRUSION DETECTION IN A NETWORK THAT INCLUDES A DISTRIBUTED VIRTUAL SWITCH FABRIC

BACKGROUND

1. Technical Field

This disclosure generally relates to networked computer systems, and more specifically relates to network intrusion detection in a network that includes a distributed virtual switch fabric.

2. Background Art

Networked computer systems are the life blood of today's business world. With the explosion of information available on the Internet, and the corresponding explosion of network technology used by companies both large and small, the complexity of networked computer system continues to increase. One important aspect for networked computer systems is security, which includes making sure that unauthorized agents do not intrude on the network. Network Intrusion Detection Systems (NIDS) have been developed that allow a system administrator to configure notification rules that correspond to certain attack signatures. When an attack that matches an attack signature is detected by the NIDS, the NIDS notifies the system administrator as specified in the corresponding notification rule. In this manner, a system administrator is made aware of the unauthorized network intrusion, and in response can take steps to counteract the network intrusion.

Many modern networks include a relatively large number of network devices, and may also include many different levels of networks, including networks between systems, networks within system, and virtual networks between or within systems. Known NIDS require the system administrator to manually configure the NIDS according to the network topology. This can be a daunting task for many of today's complex networked computer systems. In addition, known NIDS only notify the system administrator when a network intrusion is detected. Known NIDS must also be manually updated by the network administrator anytime a change to the network occurs, such as adding or replacing a network device. Without a way to perform network intrusion detection on complex networks without requiring so much human knowledge and interaction, providing the desired level of security for intrusion detection on modern networks will be difficult.

BRIEF SUMMARY

A network intrusion detection system (NIDS) works in conjunction with a distributed virtual switch fabric to provide enhanced network intrusion detection in a way that does not require as much human intervention, autonomically adjusts to hardware changes in the network, and responds much more quickly than known network intrusion detection systems. The NIDS accesses network information on a bridge of the distributed virtual switch fabric, which gives the NIDS access to hardware information for all networking devices in the network. Because the NIDS can discover the network topology by interrogating the bridge on the distributed virtual switch fabric, manual configuration of network topology within the NIDS by a system administrator is not required. In addition, access to the network information via the bridge gives the NIDS the capability of not only monitoring and alerting a human system administrator, but the NIDS may also take various service actions when an intrusion is detected, without any action required of a human system administrator. These service actions may be taken immediately, dramatically increasing the security of the network by automatically neutralizing any detected intrusions immediately using an automated service action instead of merely notifying a system administrator. The result is a NIDS that is easier to configure, maintain, and use, and that provides enhanced network security.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and:

FIG. 8 is a block diagram showing prior art attack signatures for network 1 and notification rules for network 1 defined in NIDS1 in FIG. 7;

FIG. 9 is a block diagram showing prior art attack signatures for network 2 and notification rules for network 2 defined in NIDS2 in FIG. 7;

FIG. 10 is a block diagram showing a prior art correlation between an attack signature and a corresponding notification rule;

FIG. 11 is a flow diagram of a method for the prior art NIDS (such as NIDS1 and NIDS2 in FIG. 7) to monitor network traffic for a network intrusion;

DETAILED DESCRIPTION

The claims and disclosure herein provide a network intrusion detection system (NIDS) that works in conjunction with a distributed virtual switch fabric to provide enhanced network intrusion detection in a way that does not require as much human intervention, autonomically adjusts to hardware changes in the network, and responds much more quickly than known network intrusion detection systems. The NIDS accesses network information from of the distributed virtual switch fabric, which gives the NIDS access to a virtual view that includes hardware information for all networking devices in the network. This allows the NIDS to automatically determine network topology, update itself as hardware in the network is added or changed, and promptly take automated service actions in response to detected network intrusions. The result is a NIDS that is easier to configure, maintain, and use, and that provides enhanced network security.

Figure 6:
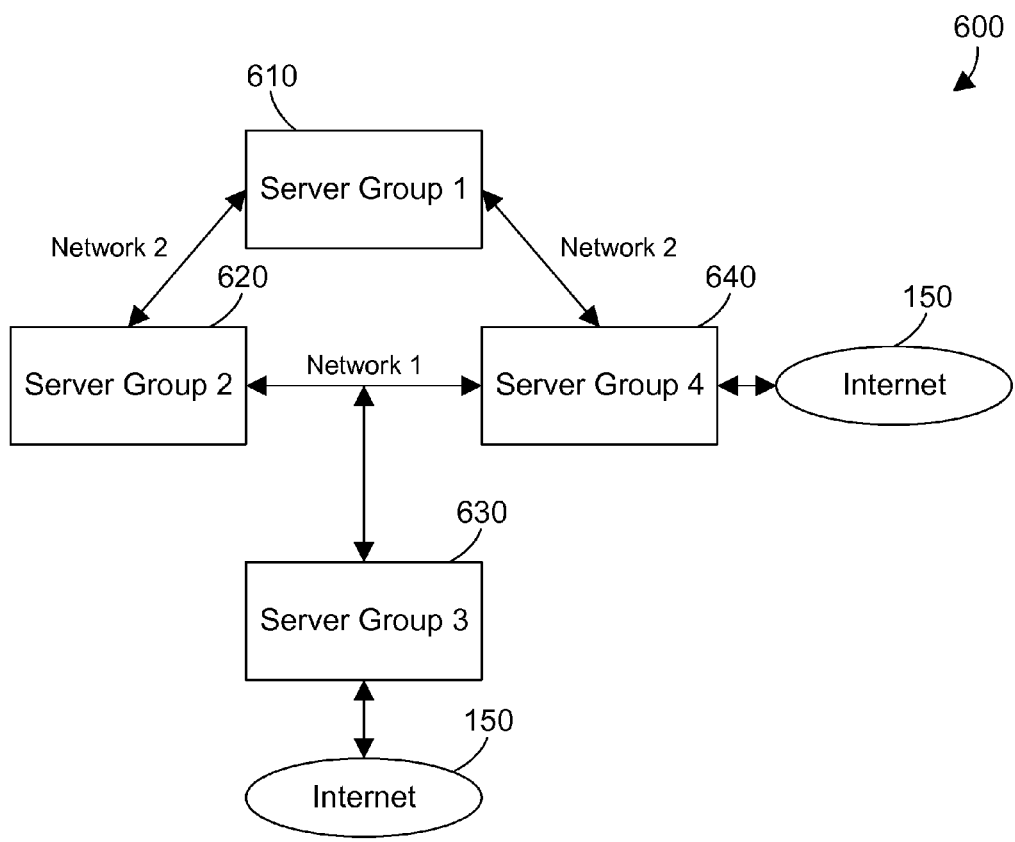
FIG. 6 is a block diagram showing a sample prior art networked computer system.

Referring to FIG. 6, a sample prior art networked computer system 600 is shown, which includes for this particular example four server groups 610, 620, 630 and 640. Server group 610 is coupled to server group 620 via Network 2. Server group 610 is coupled to server group 640 via Network 2. Server groups 620, 630 and 640 are interconnected via Network 1. Server group 630 has a connection to the Internet 150, as does server group 640. Note that each server group may include any suitable number of computer systems, network switches, or other hardware, such as racks of servers, power supplies, storage area networks, disk drives, etc. In addition, there may be multiple levels of networks, including external networks between systems, internal networks within a system, and even virtual networks within a system or between systems.

Figure 7:
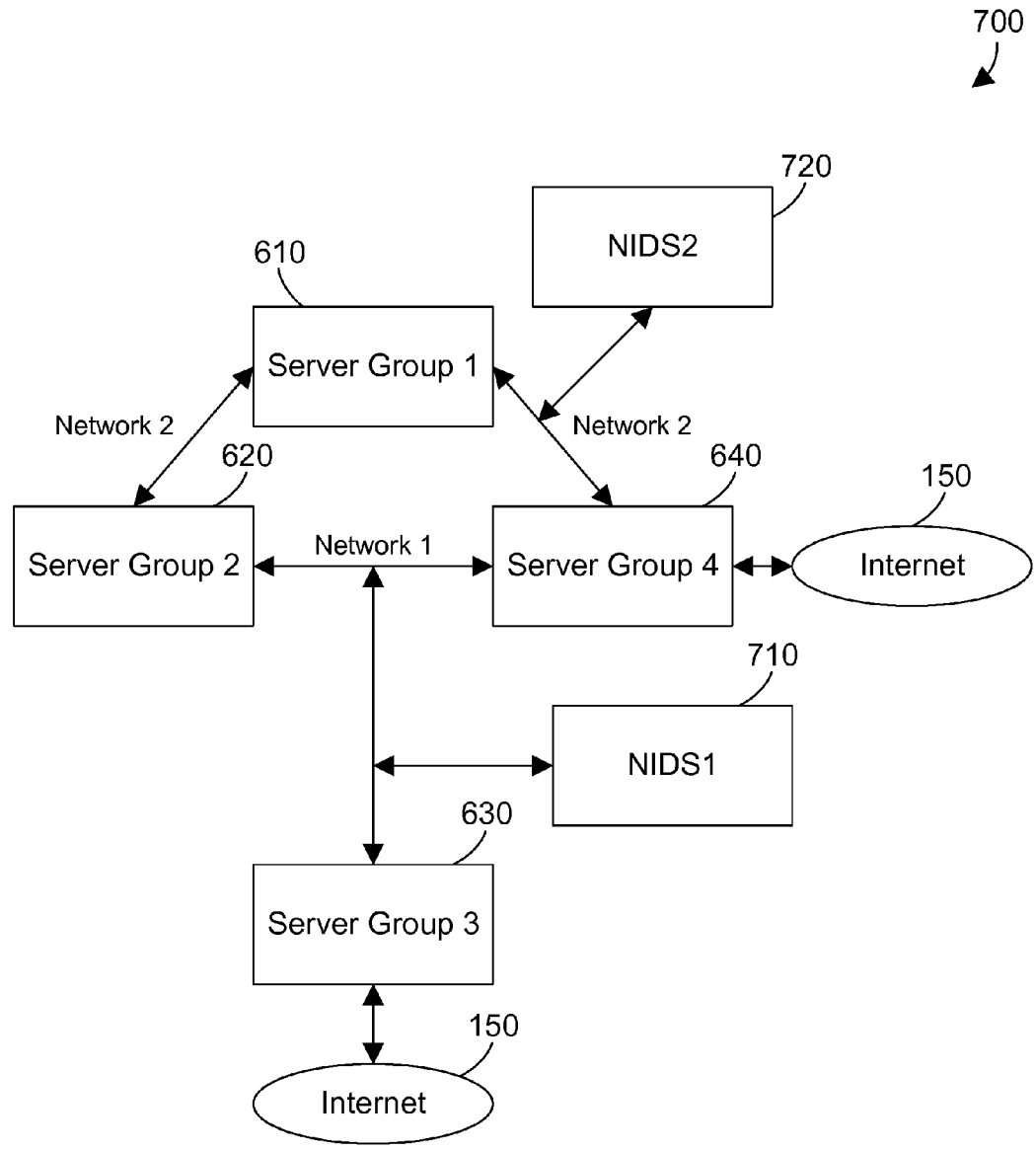
FIG. 7 is a block diagram showing the sample prior art networked computer system after adding two prior art NIDS.

FIG. 7 shows a networked computer system 700 that is the same networked computer system 600 of FIG. 6 with the addition of two prior art Network Intrusion Detection Systems (NIDS) 710 and 720. NIDS1 710 is used to detect network intrusion into Network 1 that interconnects server groups 620, 630 and 640, while NIDS2 720 is used to detect network intrusion into Network 2 that interconnects server group 610 to server groups 620 and 640. These prior art NIDS 710 and 720 are shown in FIGS. 8 and 9, respectively. NIDS1 710 includes attack signatures for network 1 810 and notification rules for network 1 820. In similar fashion, NIDS 720 includes attack signatures for network 2 910 and notification rules for network 2 920. The attack signatures specify network traffic that may be an intrusion. Typically, for each attack signature, there is a corresponding notification rule, as shown at 1010 in FIG. 10. The attack signatures may be generated manually by the system administrator, but it is more common for the attack signatures to be downloaded from a trusted source, similar to the way antivirus definitions are continually updated from a trusted source. By subscribing to a service that allows downloading and automatically updating attack signatures, the attack signatures 810 and 910 may be downloaded and updated automatically without requiring any effort on the part of a human system administrator. The notification rules 820 and 920, in contrast, are typically defined manually by the human system administrator. Because each attack signature typically has a corresponding notification rule as shown in FIG. 10, the addition of new attack signatures via an automatic update may require the system administrator to generate or identify which notification rule applies to each new attack signature.

NIDS1 710 and NIDS2 720 perform method 1100 in FIG. 11. The NIDS monitors network traffic (step 1110). When the network traffic does not satisfy an attack signature (i.e., does not qualify as a network intrusion) (step 1120=NO), method 1100 returns to step 1110 and continues. When the network traffic satisfies an attack signature (step 1120=YES), the NIDS sends one or more network messages to alert a human system administrator as specified in the notification rule corresponding to the satisfied attack signature (step 1130). In the prior art, not only must the system administrator manually define each notification rule, the system administrator must also take action manually once a notification is received from a NIDS. Because network traffic flows much faster than a human system administrator can take action to prevent the intrusion, there is a lag time between when the NIDS detects a network intrusion and when the network intrusion is stopped by the actions of the system administrator.

Figure 12:
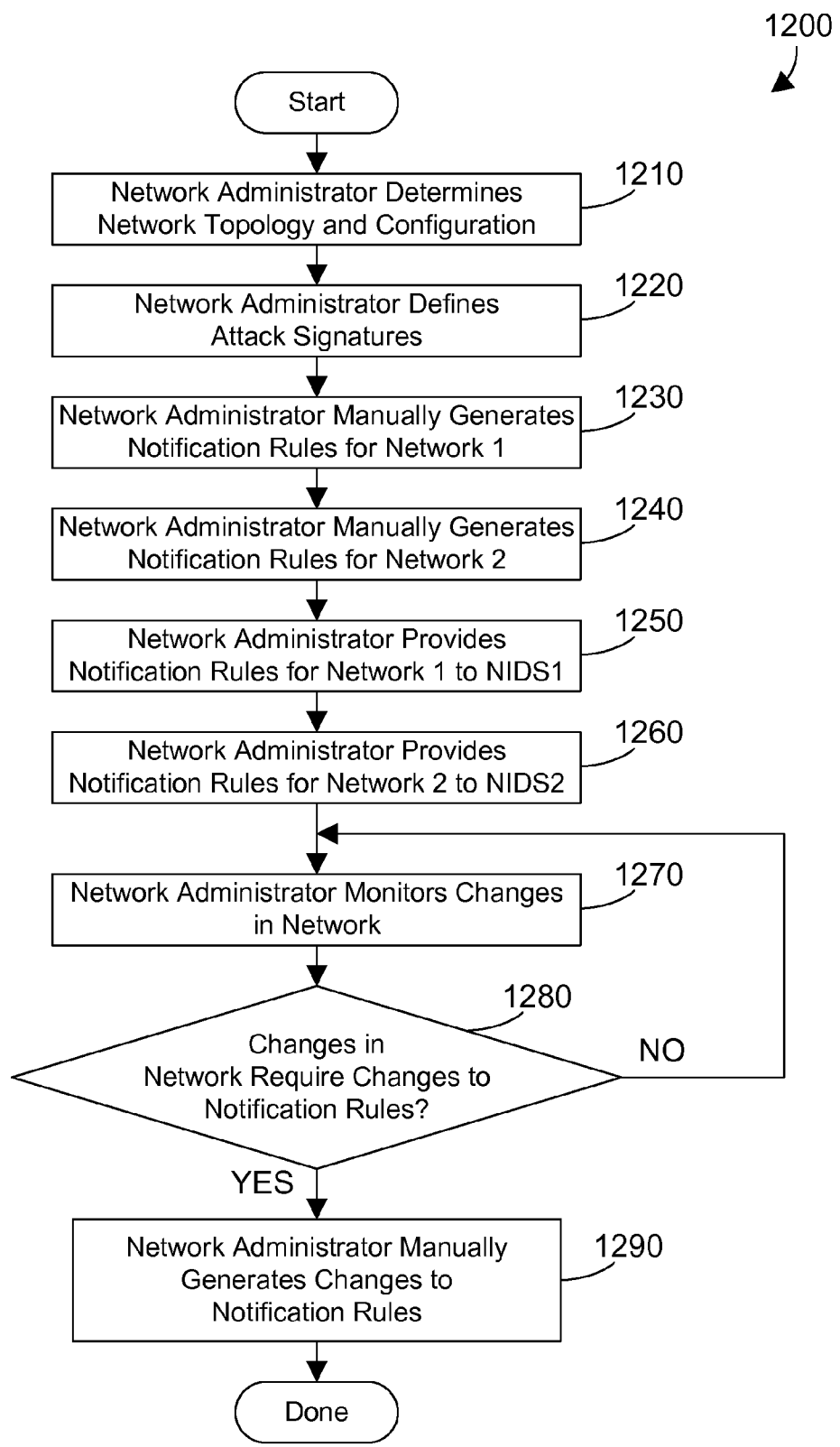
FIG. 12 is a flow diagram of a method for configuring a prior art NIDS (such as NIDS1 and NIDS2 in FIG. 7)

Referring to FIG. 12, a method 1200 shows the steps that are performed to configure and maintain a prior art NIDS, such as NIDS1 710 and NIDS2 720 in FIGS. 7-9. First, the network administrator determines the network topology and configuration (step 1210). For complex networks, this is no easy task. The network administrator must be aware of every network, sub-network, virtual network, switch, server, router, etc. in the networked computer system. The network administrator must also define the attack signatures (step 1220). Note this may be done via a subscription service as referenced above so the system administrator does not have to manually create each and every attack signature. However, the network administrator must manually generate the notification rules for Network 1 (step 1230), and must manually generate the notification rules for Network 2 (step 1240). The network administrator then provides the notification rules for Network 1 to NIDS 1 (step 1250), and provides the notification rules for Network 2 to NIDS 2 (step 1260). The network administrator then monitors changes in the network (step 1270). For example, let's assume a server blade in a rack is replaced with a new server blade. The new server blade will have a different MAC address than the old server blade. If the changes in the network require changes to the notification rules (step 1280=YES), the network administrator must manually generate changes to the notification rules (step 1290) to accommodate the changes in the network. If the changes in the network do not require changes to the notification rules (step 1280=NO), method 1200 loops back to step 1270 and continues. We see from the steps in FIG. 12 that configuring and maintaining a prior art NIDS is a highly manual effort that must be performed by a highly skilled system administrator that understands all aspects of the network topology in the networked computer system. Having such a system that so heavily relies on human intervention lends itself to human errors and necessarily requires delays due to the needed human intervention.

Figure 13:
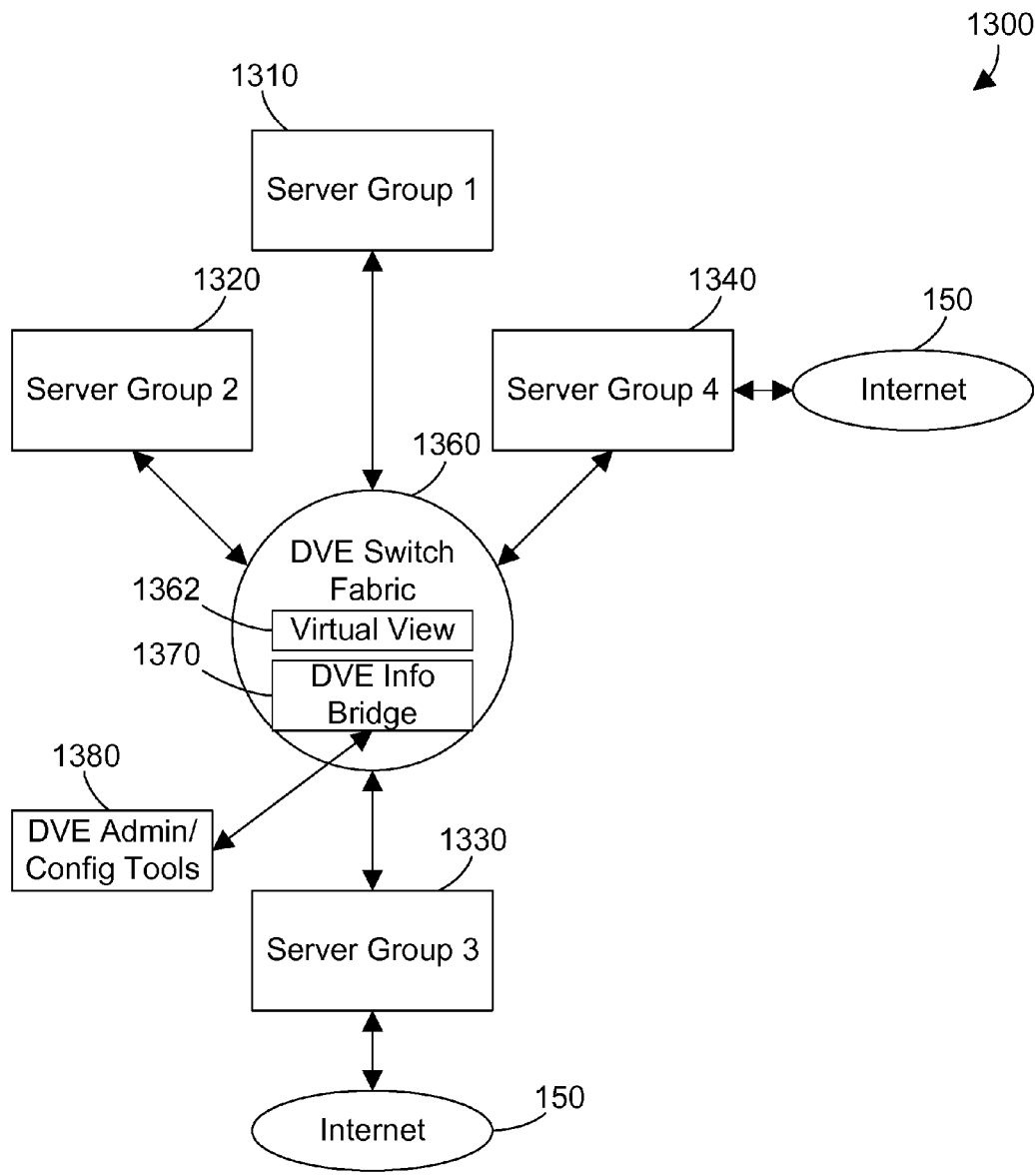
FIG. 13 is a prior art networked computer system interconnected using a distributed virtual Ethernet switch fabric that provides a virtual view of the systems and networks in the networked computer system.

As advances in networking have been made, an effort has resulted in providing a virtual view of many different networks in a networked computer system. Some network professionals refer to a complex set of networks as a "network fabric", which implies that one fabric covers all network connections and all systems in the networked computer system. For example, Juniper Networks has developed a product called Qfabric that allows providing a virtual view of all networks and systems in a networked computer system. Such a configuration is shown in FIG. 13. Four server groups 1310, 1320, 1330 and 1340 (similar to those shown in FIGS. 6 and 7) may be interconnected with a Distributed Virtual Ethernet (DVE) switch fabric 1360, such as Juniper Network's Qfabric. The DVE switch fabric 1360 includes a DVE Information Bridge 1370 that provides an interface for accessing the virtual view 1362 of the networks and systems in the DVE switch fabric 1360. DVE admin/config tools 1380 allow interacting with the DVE switch fabric via the DVE information bridge 1370 to configure the DVE switch fabric 1360. The DVE switch fabric 1360 is preferably a combination of hardware and software, but could also be a purely software implementation. Note server group 1330 is connected to the Internet 150, as is server group 1340. By using a distributed virtual switch fabric such as the DVE switch fabric 1360 shown in FIG. 13, a virtual view 1362 of the entire network may be provided in one place. This greatly eases the burden on the system administrator because all the information needed about the entire networked computer system may be accessed in one place, and by querying to the DVE switch fabric 1360 via the DVE information bridge 1370, a system administrator may learn about any and all aspects of the networked computer system from the virtual view 1362.

Figure 1:
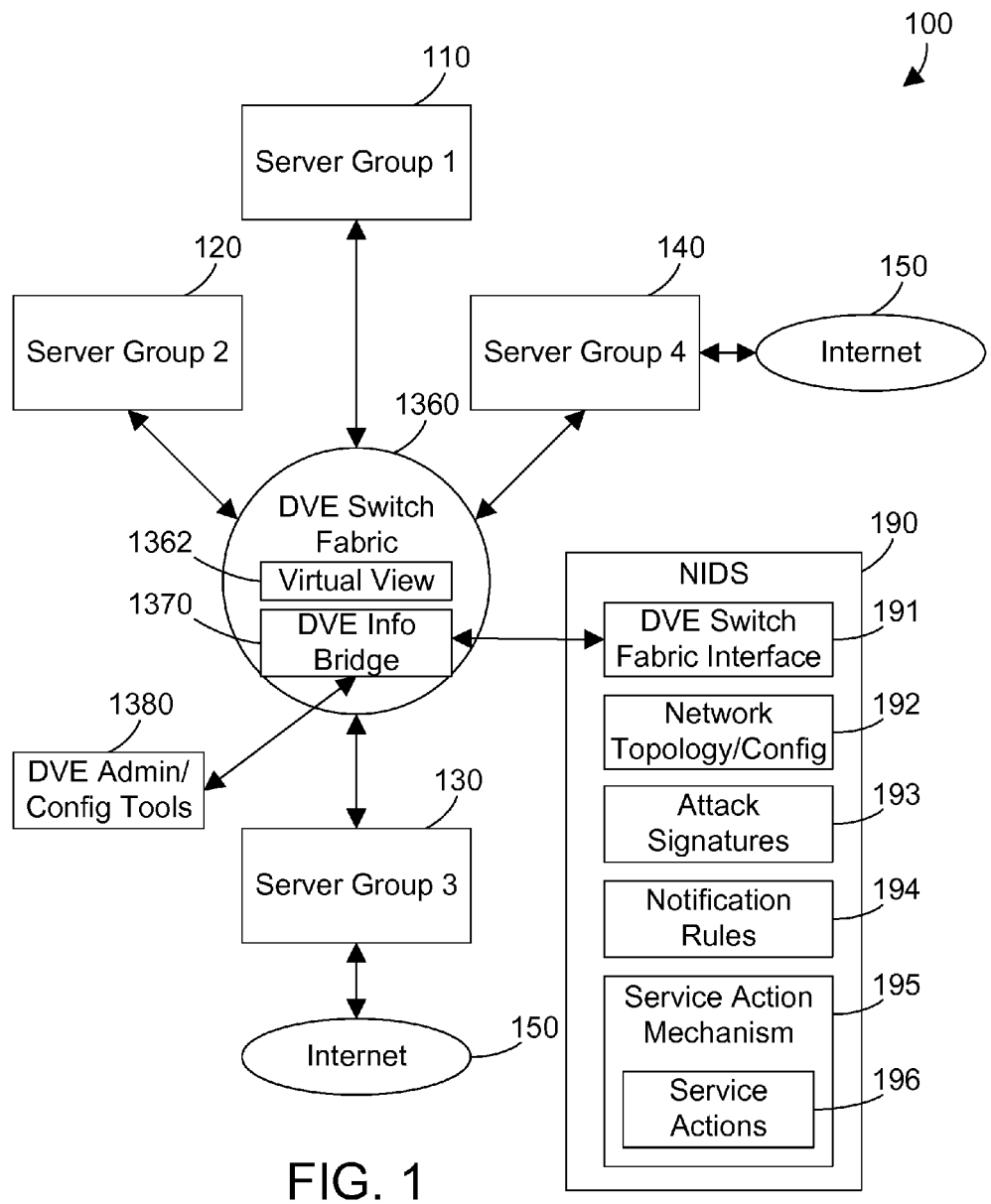
FIG. 1 is a block diagram of a networked computer system that includes a network intrusion detection system that receives network topology and configuration information from a distributed virtual Ethernet switch fabric.

The presence of the DVE switch fabric 1360 with its virtual view 1362 of the networked computer system allows a new and improved NIDS that is much easier to configure and maintain, and can take automatic service actions when a network intrusion is detected. Referring to FIG. 1, a networked computer system 100 includes four server groups 110, 120, 130 and 140 interconnected with the same DVE switch fabric 1360 shown in the prior art networked computer system in FIG. 13. Server group 130 is connected to the Internet 150, as is server group 140. DVE switch fabric 1360 includes the same DVE information bridge 1370 shown in FIG. 13 that allows access to the virtual view 1362, and the same DVE admin/config tools 1380 in FIG. 13 are used to administer and configure the DVE switch fabric 1360 in FIG. 1. A NIDS 190 is also provided that has significantly enhanced features and capabilities when compared to the prior art NIDS 710 and 720 shown in FIGS. 7-9. NIDS 190 includes a DVE switch fabric interface 191 that allows the NIDS to communicate with the DVE switch fabric 1360 via the DVE information bridge 1370 to access the virtual view 1362 of the networked computer system, thereby providing to the NIDS 190 all details of all system in the network. NIDS 190 also includes a network topology/configuration 192, which is preferably derived from the virtual view 1362 provided by the DVE switch fabric 1360. NIDS 190 also includes attack signatures 193. These attack signatures 193 could be the same as prior art attack signatures, or could have additional or different information. Notification rules 194 are provided so a system administrator may be notified of a network intrusion. However, the number of notification rules 194 in NIDS 190 is significantly less than the number of notification rules for the prior art NIDS, such as notification rules 820 in FIG. 8 and notification rules 920 in FIG. 9. In the prior art, the only thing the NIDS could do when a network intrusion was detected was to notify the system administrator, so each attack signature has a corresponding notification rule, as shown in FIG. 10. In NIDS 190, in contrast, some network intrusions may be addressed by a notification to the system administrator, but most can be handled by a service action mechanism 195 that may automatically perform one or more service actions automatically without requiring input from a human system administrator. Because so many intrusion problems may be handled by the service action mechanism 195 in NIDS 190 automatically without human intervention, the number of notification rules 194 is less than in the prior art. In addition, the response time of the NIDS 190 in addressing a network intrusion is very fast, orders of magnitude faster than notifying a system administrator and waiting for the system administrator to manually take corrective action. In fact, the response time of the NIDS 190 can be fast enough to actually prevent the detected network intrusion.

Figure 2:
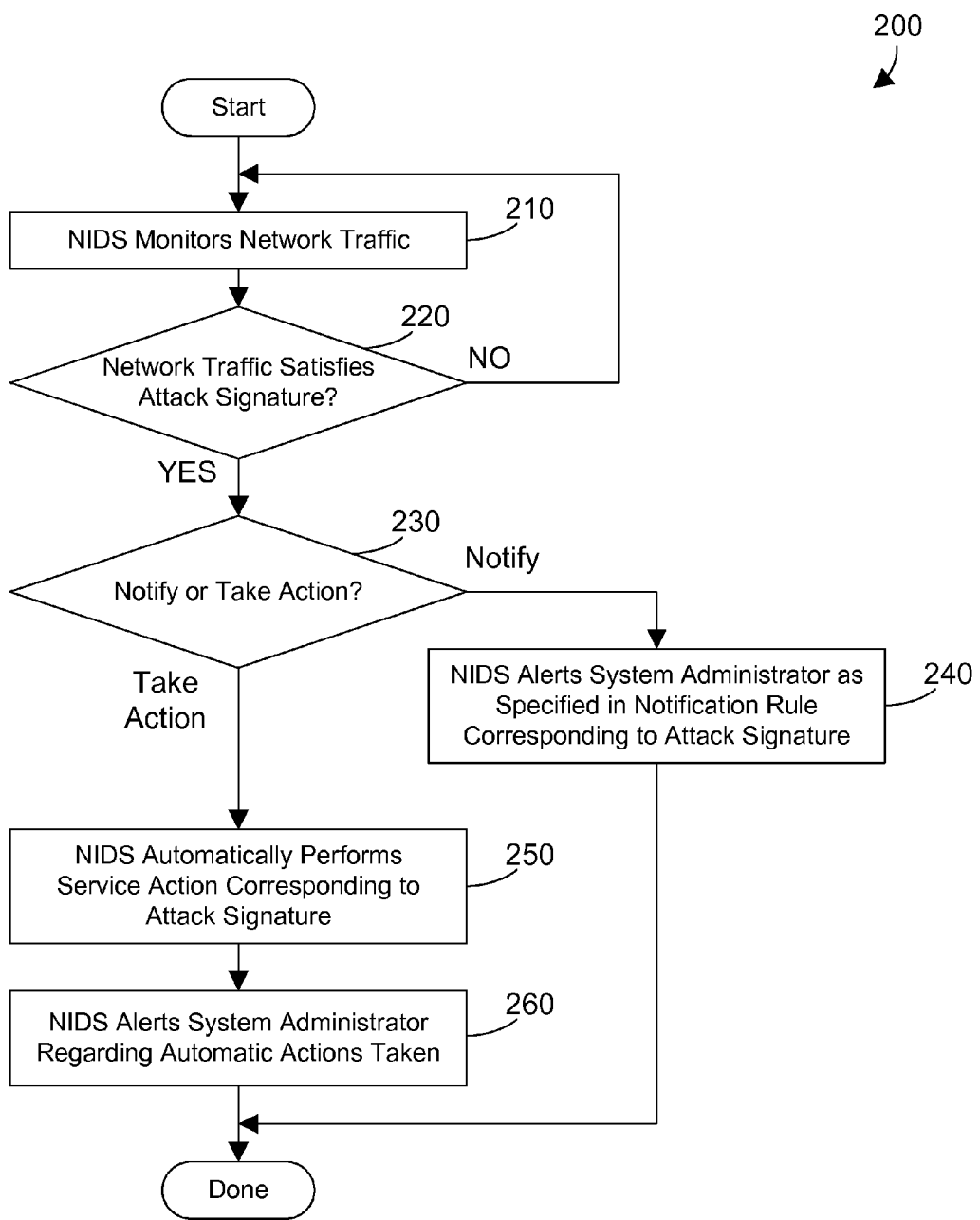
FIG. 2 is a flow diagram of a method performed by the NIDS in FIG. 1 when monitoring network traffic for a network intrusion.

Referring to FIG. 2, a method 200 shows steps performed by NIDS 190 after being configured to detect network intrusion. The NIDS monitors network traffic (step 210). When the network traffic does not satisfy any attack signature (step 220=NO), method 200 loops back to step 210 and continues. When the network traffic satisfies one or more attack signatures (step 220=YES), the NIDS determines whether to notify the system administrator or whether to take automatic action. When the NIDS is to notify the system administrator (step 230=NOTIFY), the NIDS alerts the system administrator as specified in the notification rule corresponding to the satisfied attack signature (step 240). When the NIDS is to take action (step 230=TAKE ACTION), the NIDS automatically performs one or more service actions corresponding to one or more satisfied attack signatures (step 250). The NIDS then alerts the system administrator regarding the automatic actions taken in step 250 (step 260). Method 200 is then done.

Figure 3:
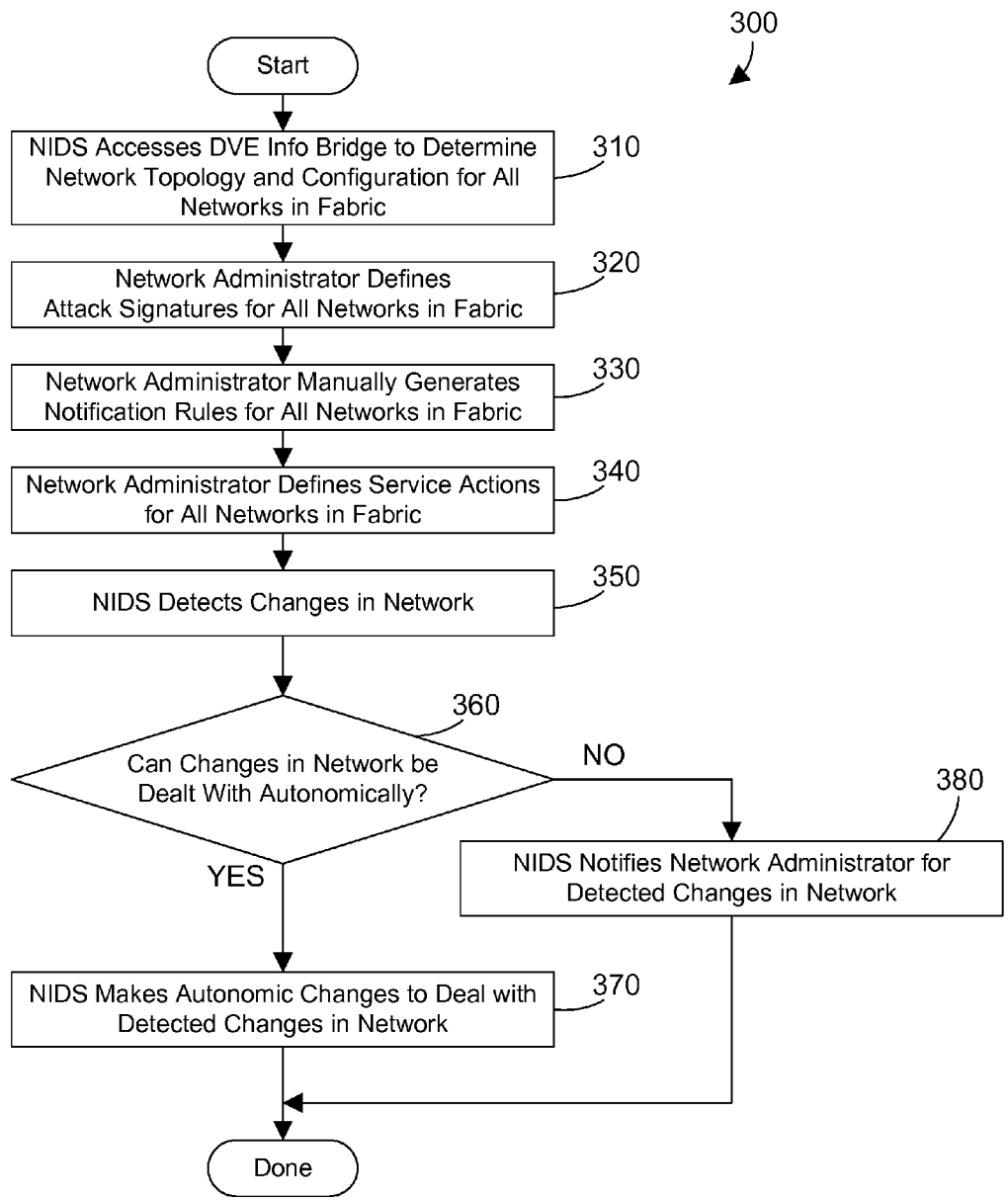
FIG. 3 is a flow diagram of a method for configuring the NIDS in FIG. 1 and for the NIDS to autonomically change its configuration when the NIDS detects a change in the network.

Referring to FIG. 3, a method 300 shows the steps for configuring and maintaining the NIDS 190 shown in FIG. 1. The NIDS accesses the DVE information bridge to determine network topology and configuration for all networks in the fabric (step 310). This is done by accessing the virtual view 1362. The network administrator defines attack signatures for all networks in the fabric (step 320). As in the prior art, the attack signatures could be downloaded and updated from a suitable provider of attack signatures. The network administrator still manually generates all needed notification rules for all networks in the fabric (step 330). The network administrator also defines service actions for all networks in the fabrics (step 340). In the most preferred implementation, each attack signature will have either a corresponding notification rule or a corresponding automated service action. The NIDS then detects changes in the network (step 350). For example, if an existing blade server is replaced with a new blade server, the NIDS will see network traffic from an unrecognized MAC address. The NIDS determines whether changes in the network can be dealt with autonomically (step 360), which is to say, without intervention by a human system administrator. For example, the NIDS in step 360 could query the virtual view in the DVE switch fabric via the DVE information bridge to determine if the new MAC address is an authorized system in the networked computer system. For the example above, the virtual view provided by the DVE switch fabric will indicate the new MAC address belongs to the replacement blade. When the changes in the network may be dealt with autonomically (step 360=YES), the NIDS makes autonomic changes to deal with the detected changes in the network (step 370). For example, when the NIDS 190 queries the virtual view in the DVE switch fabric and discovers the old server has been removed (as indicated by the removal of the corresponding MAC address) and the new server has been installed (as indicated by the presence of the new corresponding MAC address), the NIDS 190 will update its internal network topology and configuration 192 to reflect the new server with the new MAC address, and will delete the old server and MAC address corresponding to the server that was removed. Because this particular change (a swap of a new server for an old server) can be detected by querying the virtual view in the DVE switch fabric, the NIDS can make autonomic changes to deal with detected changes in the network (step 370), which requires no interaction with the system administrator. For any network changes that cannot be dealt with autonomically (step 360=NO), the NIDS notifies the network administrator to indicate the detected changes in the network (step 380) so the system administrator may take appropriate action. Method 300 is then done.

Figure 4:
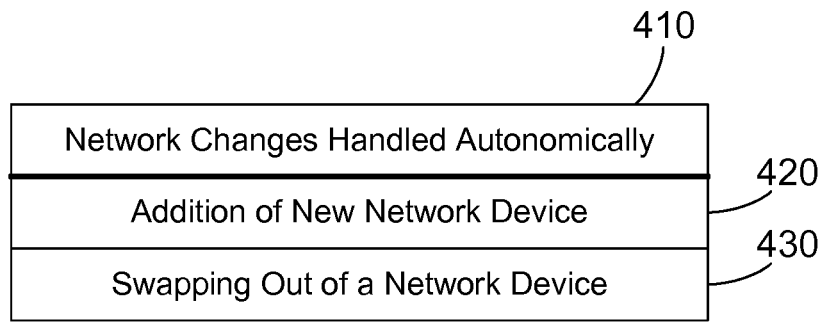
FIG. 4 is a block diagram showing possible network changes that could be handled autonomically by the NIDS in FIG. 1.
Figure 5:
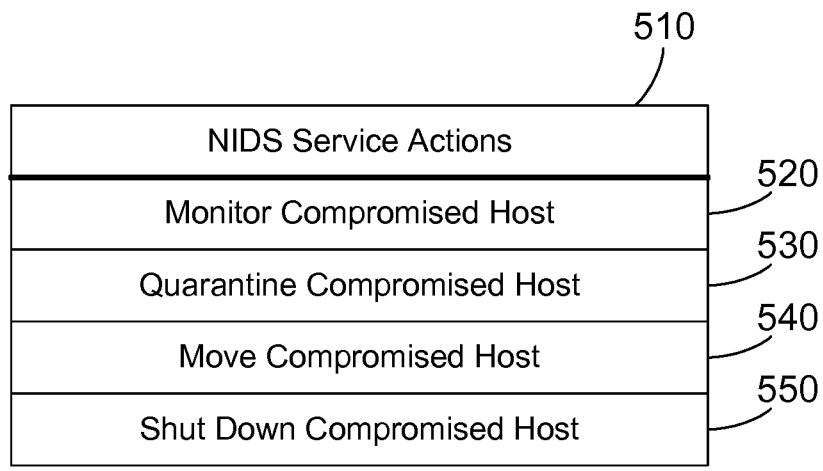
FIG. 5 is a block diagram showing possible service actions that could be performed by the NIDS in response to a detected network intrusion.

There are different changes to the network that can be handled autonomically, as shown in table 410 in FIG. 4. Network changes that may be handled autonomically by the NIDS include the addition of a new network device 420, or the swapping out of a network device 430. Both of these may be autonomically handled because network packets with a new MAC address will appear on the network, which are detected by the NIDS. In response, the NIDS can autonomically query the virtual view in the DVE switch fabric and make any needed changes to its network topology and configuration 192 without notifying a system administrator. FIG. 5 shows a table 510 that specifies some NIDS service actions that could be included in the service actions 196 shown in FIG. 1. For example, some possible NIDS service actions include monitoring the compromised host 520, quarantining the compromised host 530, moving the compromised host to another network 540, and shutting down the compromised host 550. Because the DVE switch fabric provides a virtual view of all systems and networks in the networked computer system, and provides tools for reconfiguring the networks and systems, the DVE switch fabric provides the needed functionality for the NIDS to perform service actions such as those shown in FIG. 5 by interacting with the DVE switch fabric to perform those service actions. For example, if a particular server is compromised, the NIDS 190 can instruct the DVE switch fabric 1360 to shut down the compromised server. The DVE switch fabric 1360 thus provides information in the form of a virtual view of the entire network along with an interface that allows greatly enhancing the functionality of the NIDS 190 when compared to prior art NIDS 710 and 720 shown in FIGS. 7-9.

Some examples are now provided to illustrate the difference between the function of prior art NIDS and the NIDS 190 disclosed herein. For the first example, let's assume a NIDS needs to be deployed to monitor all network traffic in a virtual local area network (vlan) X running on a physical network Y. In the prior art, the system administrator would deploy a prior art NIDS somewhere in the physical network Y. The system administrator would then have to manually enter all network end points, speeds and any other needed network topology or configuration information into the NIDS. The system administrator would also have to manually enter all the trusted adapter MAC addresses into the NIDS. The system administrator would also have to configure the notification rules for the various attack signatures. The system administrator can then enable the NIDS to monitor the network traffic in vlan X and physical network Y. The NIDS watches the incoming/outgoing traffic for vlan X and physical network Y, and learns Internet Protocol (IP) addresses, Address Resolution Protocols (ARPs), gateways, etc. As shown in FIG. 11, network traffic is then monitored and compared to the attack signatures, and a system administrator is notified when the network traffic satisfies any attack signature.

For the NIDS 190 shown in FIG. 1, for the same example above where the NIDS needs to be deployed to monitor all network traffic in vlan X running on a physical network Y, the NIDS 190 is deployed in the physical network Y. The NIDS 190 queries the virtual view 1362 in the DVE switch fabric 1360 in FIG. 1 via the DVE information bridge 1370 to determine the network topology and MAC addresses for vlan X and physical network Y. The system administrator configures any needed notification rules, and also specifies any needed service actions. In the most preferred implementation, there is a notification rule or service action specified for each attack signature. The NIDS is then enabled to monitor network traffic in vlan X and physical network Y. The NIDS watches the incoming/outgoing traffic for vlan X and physical network Y, and learns Internet Protocol (IP) addresses, Arps, gateways, etc. As shown in FIG. 2, network traffic is then monitored and compared to the attack signatures, and when an attack signature is satisfied, the NIDS either alerts the system administrator or automatically performs one or more service actions to take care of the network intrusion without requiring input from a system administrator. This first example illustrates how much easier it is to configure and maintain NIDS 190 when compared to the prior art NIDS.

In a second example, we assume an existing network adapter is swapped for a new network adapter while the network is up and running. In the prior art, the node, blade or PCI slot that contains the network adapter to be serviced is powered down. The hardware swap of the network adapters is performed. The hardware is powered on, and the link goes active. The new hardware sees network traffic and is part of the network. The NIDS detects network packets from a MAC address that is unrecognized, and as a result, alerts the system administrator as shown in FIG. 11. The system administrator will typically respond to the NIDS alarm by suspending the NIDS. The system administrator must then reconfigure the NIDS to delete all old rules/learning based on the old MAC address that has been removed, and must add the new MAC address to the list of trusted host MAC addresses in the NIDS. The system administrator then re-enables the NIDS, which begins to re-learn what the network traffic looks like in the new configuration. Note that suspending then re-enabling the prior art NIDS results in a period of time when the network is not protected by the NIDS.

For the NIDS 190 in the same second example, where an existing network adapter is swapped for a new network adapter while the network is up and running, the node, blade or PCI slot that contains the network adapter to be serviced is powered down. The hardware swap of the network adapters is performed. The hardware is powered on, and the link goes active. The new hardware sees traffic and is part of the network. The NIDS detects network packets from a MAC address that is unrecognized, and as a result, queries the virtual view 1362 in the DVE switch fabric 1360 via the DVE information bridge 1370, which tells the NIDS the new network adapter is a replacement for the old network adapter. The NIDS autonomically updates its rules and traffic records to change from the old MAC address to the new MAC address. The NIDS thus autonomically adjusts to the swap in network cards without suspending and re-enabling the NIDS, as required in the prior art. The result is a more secure network because the NIDS is always operational.

In a third example, we assume the NIDS is up and running, and detects an IP-spoof attack. For the prior art NIDS, such as NIDS 710 and 720 shown in FIGS. 7-9, a host MAC address is identified as the compromised host, and an alert is sent to the system administrator as shown in FIG. 11. There is naturally some time lapse between the time the system administrator gets the alert and the time the system administrator can address this problem. The system administrator manually queries network configuration to determine which node or blade the compromised MAC address is in. The system administrator may then manually shut down the compromised network link, at which point the network is secure again. Notice the time delay between notifying a system administrator and the system administrator shutting down the compromised hardware may be several minutes, possibly more, which could result in the network being vulnerable to the IP-spoof attack during that time delay.

For the NIDS 190 in FIG. 1 for the same third example above, we assume the NIDS is up and running, and detects an IP-spoof attack. A host MAC address is identified as the compromised host. The NIDS 190 accesses the virtual view 1362 in the DVE switch fabric 1360 via the DVE information bridge 1370, and instructs the DVE switch fabric 1360 to shut down the compromised host with the specified MAC address. The DVE switch fabric 1360 uses its internal MAC address database to translate the specified MAC address to a particular node or blade. The DEV switch fabric 1360 then shuts down the network link for the node or blade corresponding to the MAC address, and the network is secure again. The system administrator then gets an alert about the compromised host on the network. Because the NIDS reacted immediately to shut down the compromised host, the time delay between intrusion detection and shut down of the compromised host is very small compared to the time to notify a system administrator, who must then manually correlate the problem MAC address to hardware, and then manually shut down the hardware. The NIDS presented herein provides a much more secure network because it always runs, it autonomically adjusts for changes in the network, and it can take service actions immediately to address a network intrusion.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language, Streams Processing language, or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The methods disclosed herein may be performed as part of providing a web-based service. Such a service could include, for example, offering the method to online users in exchange for payment.

The disclosure and claims are directed to a network intrusion detection system (NIDS) that works in conjunction with a virtual view in a distributed virtual switch fabric to provide enhanced network intrusion detection in a way that does not require as much human intervention, autonomically adjusts to hardware changes in the network, and responds much more quickly than known network intrusion detection systems. The NIDS accesses network information from of the distributed virtual switch fabric, which gives the NIDS access to a virtual view that includes hardware information for all networking devices in the network. This allows the NIDS to automatically determine network topology, update itself as hardware in the network is added or changed, and promptly take automated service actions in response to detected network intrusions. The result is a NIDS that is easier to configure, maintain, and use, and that provides enhanced network security.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. A networked computer system comprising:
   a plurality of systems that each include at least one processor;
   a plurality of networks interconnecting the plurality of systems;
   a distributed virtual switch fabric that provides a virtual view of the plurality of networks and the plurality of systems; and
   a network intrusion detection system coupled to the distributed virtual switch fabric, the network intrusion detection mechanism comprising:
      a plurality of attack signatures that specify characteristics of network intrusions;
      an interface to the distributed virtual switch fabric that allows querying the distributed virtual switch fabric to determine from the virtual view, network topology and configuration of the networked computer system, wherein the network intrusion detection mechanism detects a change to the plurality of systems, queries the distributed virtual switch fabric to determine if the change is reflected in the virtual view of the plurality of networks and the plurality of systems, and when the change is reflected in the virtual view, the network intrusion detection mechanism autonomically changes the network topology and configuration in the network intrusion detection mechanism without input from a human system administrator; and
      a plurality of service actions that each may be performed automatically by the network intrusion detection mechanism without input from a human system administrator when a network intrusion that matches at least one of the plurality of attack signatures is detected by the network intrusion detection system.

2. The networked computer system of claim 1 wherein the plurality of service actions comprises monitoring a compromised host that originated network traffic detected as the network intrusion.

3. The networked computer system of claim 1 wherein the plurality of service actions comprises quarantining a compromised host that originated network traffic detected as the network intrusion.

4. The networked computer system of claim 1 wherein the plurality of service actions comprises moving to a different network a compromised host that originated network traffic detected as the network intrusion to a different network.

5. The networked computer system of claim 1 wherein the plurality of service actions comprises shutting down a compromised host that originated network traffic detected as the network intrusion.

6. The networked computer system of claim 1 wherein the change to the plurality of systems comprises an addition to the plurality of systems.

7. An article of manufacture comprising software stored on a non-transitory computer readable storage medium, the software comprising:
   a network intrusion detection system coupled to a distributed virtual switch fabric in a networked computer system that comprises a plurality of networks interconnecting a plurality of systems, the network intrusion detection mechanism comprising:
      a plurality of attack signatures that specify characteristics of network intrusions;
      an interface to the distributed virtual switch fabric that allows querying the distributed virtual switch fabric to determine from the virtual view, network topology and configuration of the networked computer system, wherein the network intrusion detection mechanism detects a change to the plurality of systems, queries the distributed virtual switch fabric to determine if the change is reflected in the virtual view of the plurality of networks and the plurality of systems, and when the change is reflected in the virtual view, the network intrusion detection mechanism autonomically changes the network topology and configuration in the network intrusion detection mechanism without input from a human system administrator; and
      a plurality of service actions that each may be performed autonomically by the network intrusion detection mechanism without input from a human system administrator when a network intrusion that matches at least one of the plurality of attack signatures is detected by the network intrusion detection system.

8. The article of manufacture of claim 7 wherein the plurality of service actions comprises monitoring a compromised host that originated network traffic detected as the network intrusion.

9. The article of manufacture of claim 7 wherein the plurality of service actions comprises quarantining a compromised host that originated network traffic detected as the network intrusion.

10. The article of manufacture of claim 7 wherein the plurality of service actions comprises moving to a different network a compromised host that originated network traffic detected as the network intrusion to a different network.

11. The article of manufacture of claim 7 wherein the plurality of service actions comprises shutting down a compromised host that originated network traffic detected as the network intrusion.

12. The article of manufacture of claim 7 wherein the change to the plurality of systems comprises an addition to the plurality of systems.

* * * * *